United States Patent [19]

Bush

[11] Patent Number: 5,835,377
[45] Date of Patent: Nov. 10, 1998

[54] METHOD AND SYSTEM FOR OPTIMIZED MATERIAL MOVEMENT WITHIN A COMPUTER BASED MANUFACTURING SYSTEM UTILIZING GLOBAL POSITIONING SYSTEMS

[75] Inventor: Ronald Roscoe Bush, Austin, Tex.

[73] Assignee: International Business Machines Corporation, Armonk, N.Y.

[21] Appl. No.: 822,892

[22] Filed: Mar. 24, 1997

[51] Int. Cl.⁶ .................................................... G06F 19/00
[52] U.S. Cl. ............................. 364/468.05; 364/468.22; 705/8
[58] Field of Search ......................... 364/468.01–468.03, 364/468.05–468.14, 468.19, 468.2, 468.22, 468.23, 478.13, 478.14, 478.16–478.18; 705/7, 8, 28, 29; 342/357; 701/24–26, 213; 340/539

[56] References Cited

U.S. PATENT DOCUMENTS

| | | | |
|---|---|---|---|
| 4,669,047 | 5/1987 | Chucta | 364/468.2 |
| 5,187,805 | 2/1993 | Bertiger et al. | 455/12.1 |
| 5,389,934 | 2/1995 | Kass | 342/357 |
| 5,442,561 | 8/1995 | Yoshizawa et al. | 364/468.06 |
| 5,451,964 | 9/1995 | Babu | 342/357 |
| 5,467,285 | 11/1995 | Flinn et al. | 364/478 |
| 5,686,888 | 11/1997 | Welles, II et al. | 340/539 |

OTHER PUBLICATIONS

GPS Tracking and Remote Control, "Welcome to the World of MIRAS," World Wide Web: miras@shadow.net, 1996 SPS Technologies Corporation, Jan. 17, 1997.

NAVTRAX Vehicle Tracking/Fleet Management System, World Wide Web: pulsearch.ca/navtrax.htm—Jan. 17, 1997.
DigiStar GPS Vehicle Tracking Software, Digital Wireless Corporation, World Wide Web: digitalwireless.com/gps-mon.htm—Jan. 17, 1997.
COMWARE AVL Autotrac, Automatic Vehicle Location AVL unit AutoTrac, World Wide Web: pip.dknet.dk/~pip1573/comware.htm—Jan. 17, 1997.

*Primary Examiner*—Reba I. Elmore
*Assistant Examiner*—Steven R. Garland
*Attorney, Agent, or Firm*—David A. Mims. Jr.; Andrew J. Dillon

[57] ABSTRACT

A method and system for optimized material movement within a computer based manufacturing system utilizing global positioning systems. A tracking module which includes a wireless communication device, such as a cellular telephone chip set, and a position determination system, such as a global positioning receiver chip set, is built into each shipping container, vehicle or the like which is utilized to transport material for a computer based manufacturing system. The source and itinerary for each shipment of material, as well as a manufacturing schedule, are then loaded into the computer system which controls the manufacturing system. Periodically, the location of each shipment is then determined by querying the tracking module for a current actual location which is then compared within the computer system with a planned location, determined from the stored itinerary for that shipment. Variations in location of a selected shipment which exceed a specified amount are then utilized to initiate a variation in the manufacturing process, issue alternate shipment orders or initiate the selection of an alternate source for the material within that shipment.

11 Claims, 3 Drawing Sheets

METHOD AND SYSTEM FOR OPTIMIZED MATERIAL MOVEMENT WITHIN A COMPUTER BASED MANUFACTURING SYSTEM UTILIZING GLOBAL POSITIONING SYSTEMS

BACKGROUND OF THE INVENTION

1. Technical Field:

The present invention relates in general to improvements in computer based manufacturing systems and in particular, to improved methods and systems for tracking and optimizing the movement of material within a computer based manufacturing system. Still more particularly, the present invention relates to an improved method and system for automatically altering a manufacturing schedule or material shipment parameter in response to shipment location determinations which are determined utilizing the global positioning system.

2. Description of the Related Art:

Computer based manufacturing systems are well known in the art. The process of designing, developing, and manufacturing a new product, or making changes to existing products, presents many challenges to product managers and manufacturing managers. It is important to maintain product quality while bringing a product to market for the least cost, within a set schedule. In today's highly competitive industries, product managers and manufacturing managers require information to address many problems which arise because of the complexity of new problems and the complexity of world-wide production and the changing nature of competition. A requirement that products be manufactured for the least possible cost is an important requirement in all industries.

Many texts have been written concerning the field of production management. For example, Joseph Orlicky wrote "*Material Requirement Planning*", published by McGraw-Hill, which has become the industry standard reference for almost all job shop planning requirements. This concept of planning and releasing work to the manufacturing shop floors is well accepted and, even today, many vendors are selling software based upon this concept. From a dispatching point of view, this system takes into account only the general concept of a first-in, first-out (FIFO) basis of dispatching. Dr. D. T. Phillips and G. L. Hogg published a paper entitled "*A State-of-the Art Survey of Dispatching Rules for Manufacturing Shop Operations*", International Journal of Production Research, Volume 20, No. 1, pages 27–45, which provide varying dispatching rules which may be utilized in a planning process.

International Business Machines Corporation has developed a product "Capacity Planning and Operation Sequencing System (CAPOSS)", described in Education Guide No. SR 19-5004-0, published by International Business Machines Corporation, which provides static dispatching functions in the form of deciding the next operation to be performed for an order after completion of a prior operation.

One important feature in modern day manufacturing facilities is the need for an improved parts and materials supply system which is necessary to minimize inventory and floor space required for parts storage at workstations. The efficiency and economy of so-called "just in time" inventory control systems is now well recognized and many systems have been implemented which attempt to impose such a delivery system. For example, U.S. Pat. No. 4,669,047 discloses an automated parts supply system which may be utilized to implement a "just in time" supply system.

U.S. Pat. No. 4,472,783 describes an improved flexible manufacturing system which utilizes multiple numerically controlled machine tools. In accordance with a supervisory control computer, the system described therein supplies routing information to the material handling system controller which in response, controls the movement of pallets through a manufacturing production path to various machine tools. This system deals with a novel method of controlling a specific type of manufacturing line.

Similarly, U.S. Pat. No. 4,561,060 describes a system for controlling the flow of articles within a work area which includes multiple workstations and for acquiring real time information relating to the status of the work in progress.

More recently, U.S. Pat. No. 5,467,285 discloses a method and system for determining an optimal material movement product path within a computer based manufacturing system utilizing a transport matrix which is created having multiple rows and columns wherein each row and column is associated with a workstation within a computer based manufacturing system. At each cell within the matrix located at an intersection of a selected row and column, the attributes of all possible methods of transport between associated workstations are listed. Preferably transport attributes, such as transport type, velocity/distance, travel time, capacity, authorization required, fragility, cost and current status of the transport system are listed within the cell and may therefore be dynamically updated. After identifying a selected product path, an analysis of the transport matrix may be utilized to determine an optimal route based upon user inputs, such as the most rapid, least expensive, or most reliable form of transport for transporting material between selected workstations.

While each of the systems describes an improvement to the basic computer based manufacturing system which permits parts supplies to be tracked within a manufacturing facility, a problem exists with respect to the tracking of parts within the global marketplace which are necessary to implement a "just in time" manufacturing system. Variations which occur in transport as a result of transportation breakdowns, customs delays or the like can wreak havoc in a computer based manufacturing system which is attempting to implement a "just in time" supply system.

Consequently, a need exists for a method and system for optimizing material movement within a computer based manufacturing system which can efficiently track the location of many different shipments of material which are directed to the manufacturing facility.

SUMMARY OF THE INVENTION

It is therefore one object of the present invention to provide an improved computer based manufacturing system.

It is another object of the present invention to provide an improved method and system for tracking and optimizing the movement of material within a computer based manufacturing system.

It is yet another object of the present invention to provide an improved method and system for automatically altering a manufacturing schedule or material shipment parameter in response to location determinations which are determined utilizing a global positioning system.

The foregoing objects are achieved as is now described. A method and system for optimized material movement within a computer based manufacturing system utilizing global positioning systems is disclosed. A tracking module which includes a wireless communication device, such as a cellular telephone chip set, and a position determination system, such as a global positioning receiver chip set, is built into each shipping container, vehicle or the like which is utilized to transport material for a computer based manufacturing system. The source and itinerary for each shipment of material, as well as a manufacturing schedule, are then loaded into the computer system which controls the manufacturing system. Periodically, the location of each shipment is then determined by querying the tracking module for a current actual location which is then compared within the computer system with a planned location, determined from the stored itinerary for that shipment. Variations in location of a selected shipment which exceed a specified amount are then utilized to initiate a variation in the manufacturing process, issue alternate shipment orders or initiate the selection of an alternate source for the material within that shipment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
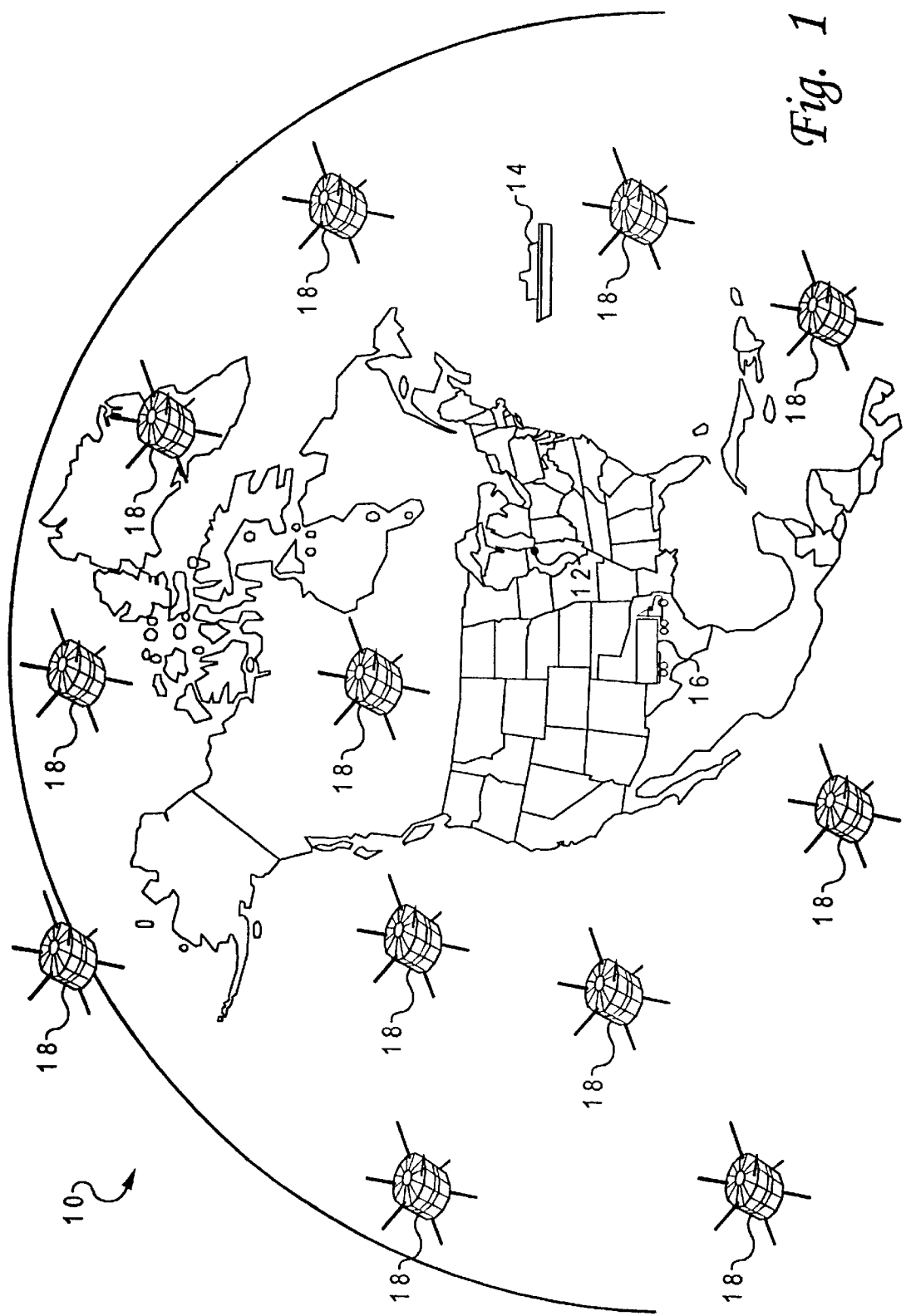
FIG. 1 is a partially schematic pictorial view of a global positioning system which may be utilized to implement the method and system of the present invention.

With reference now to the figures and in particular with reference to FIG. 1, there is depicted a partially schematic pictorial view of a global positioning system 10 which may be utilized to implement the method and system of the present invention. As illustrated, a manufacturing facility 12, which may be located, for example, within Chicago, Ill., is the site for a computer based manufacturing system. Shipments of material destined for manufacturing facility 12 may be transported from remote locations to manufacturing facility 12 utilizing many different means of transport. For example, a transport ship 14 or a transport vehicle 16 may be utilized to transport remotely originating material shipments to manufacturing facility 12. Similarly, barges, railroads, or some combination thereof, may also be utilized to transport remotely originating material shipments to manufacturing facility 12.

Also depicted within global system 10 are a plurality of terrestrial satellites 18. As those skilled in this art will appreciate, the satellite network comprising a plurality of satellites 18 may be implemented utilizing several combinations of satellite systems. For example, the existing global positioning satellite (GPS) system may be utilized. This system comprises a large number of satellites in orbit approximately 11,000 miles above the earth's surface, inclined at about 55 degrees from the equatorial plane. The satellites are not at a constant position but have a 12 hour orbit. At any point on the earth, a ground based receiver can normally receive signals from at least four GPS satellites. A basic explanation of the GPS system and its use in surveying is given in Hurn, "*GPS, A Guide to the Next Utility*", Trimble Navigation, 1989. The details of the global positioning system are believed to be within the ambit of those having ordinary skill in this art and thus, the details of such a system form no part of this specification.

As those having skill in this art will appreciate, each GPS satellite typically transmits signals which contain information which enables distance measurement to be made by measuring the transit time of a pseudo-random number (PRN) code from a satellite to a particular GPS receiver. The PRN code is a very faint signal which hardly registers above the earth's natural background noise; however, this signal can be received by an antenna only inches in size. Decoding of these signals is accomplished in known fashion by sampling the PRN code and correlating the code with a replica code generated by a GPS receiver, thus permitting the PRN code to be picked out of the earth's background noise.

This PRN code typically includes an implicit time signal, as measured by an atomic clock on board the satellite, at which time the signal left the satellite. Over time, these signals also include information about the satellite's current orbit in space as well as correction for known errors in the satellite's clock.

Additionally, as will be described in greater detail herein, the satellite network comprised of satellites 18 may also include a wireless communication system. One example of such a system is the proposed Iridium system being implemented currently. This system proposes to permit cellular telephone communication from any point upon the face of the earth utilizing a large number of low altitude satellites. While described as a satellite system herein, those having ordinary skill in the art will appreciate that any form of wireless communication may be utilized in conjunction with the system of the present invention with equal advantage.

Figure 2:
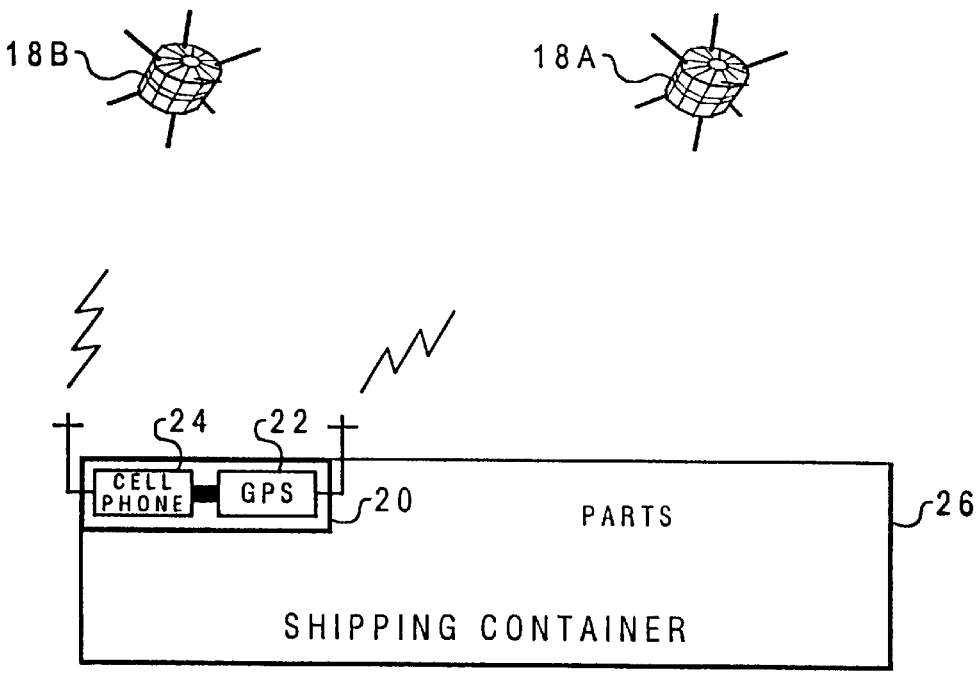
FIG. 2 is a schematic representation of a tracking module within a shipping container which may be utilized to implement the method and system of the present invention.

Referring now to FIG. 2, there is depicted a schematic representation of a tracking module 20 within a shipping container 26 which may be utilized to implement the method and system of the present invention. As those having ordinary skill in the art will appreciate, shipping container 26 may comprise a shipping package, a shipping container suitable for transport utilizing a truck, ship or railroad, or the actual truck, ship or other vehicle. Mounted within shipping container 26 is tracking module 20. Tracking module 20 is preferably a small, possibly battery powered, highly robust electronic system which includes a wireless communication device, such as cellular telephone chip set 24 which is coupled to a position determination device such as global positioning satellite receiver chip set 22.

Tracking module 20 thus can be utilized to determine the instantaneous location of shipping container 26 by receipt of the above referenced PRN signals from global positioning system satellites 18A and cellular telephone chip set 24 may be utilized to communicate in a wireless fashion utilizing, for example, a low altitude network of satellites 18B.

Further, as the tracking module is intended for automatic communication between shipping container 26 and a computer based manufacturing facility, the traditional user interface portion of both a cellular telephone device and global positioning system receiver device will not be necessary. Thus, displays, keyboards, ringer devices and the like find no necessary application within tracking module 20. By interconnecting the chip set of a global positioning system satellite receiver chip set 22 with a cellular telephone chip set 24, the instantaneous location of shipping container 26 may be determined from a remote location, in a manner which will be explained in greater detail herein.

Figure 3:
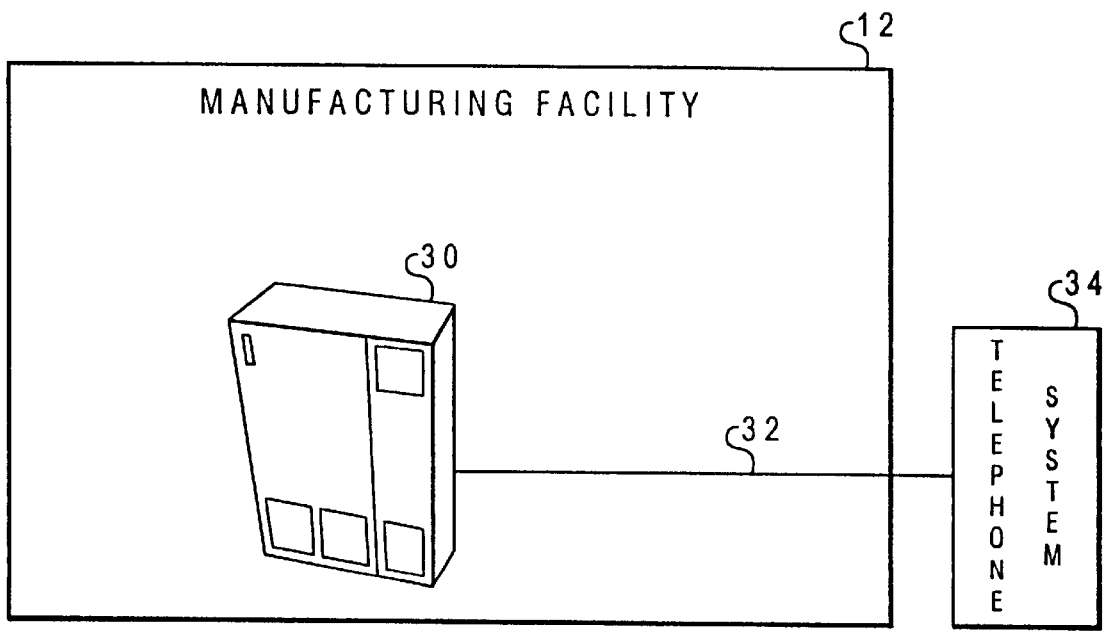
FIG. 3 is a schematic representation of a computer based manufacturing system which may be utilized to implement the method and system of the present invention.

With reference now to FIG. 3, there is depicted a schematic representation of a computer based manufacturing system which may be utilized to implement the method and system of the present invention. As illustrated, manufacturing facility 12 includes a computer system 30 which controls operations within manufacturing facility 12. Computer system 30 may comprise, in a preferred embodiment of the present, a suitable computer such as the AS/400 manufactured by International Business Machines Corporation of Armonk, N.Y.

As depicted, computer system 30 is preferably coupled to the central telephone system 34 utilizing a suitable computer port 32. Those having skill in the art will appreciate that the manner by which a computer can communicate remotely via a telephone system such as telephone system 34 is well known to those skilled in this art and consequently, the communication port and the details of this interface are not depicted within FIG. 3.

Thus, referring to FIGS. 2 and 3, as will be described in greater detail below, computer system 30 may periodically query the wireless communication device within tracking module 20 utilizing computer port 32 and the central telephone system 34. By connecting to the wireless communication device within tracking module 20 within shipping container 26, the current actual position of shipping container 26 may be obtained via the position determination system contained within tracking module 20 and communicated, at high speed, to manufacturing facility 12. Alternately, the wireless communication device within tracking module 20 may be programmed to periodically contact computer system 30 and report the current actual position of shipping container 26, without departing from the spirit and intent of the present invention.

Figure 4:
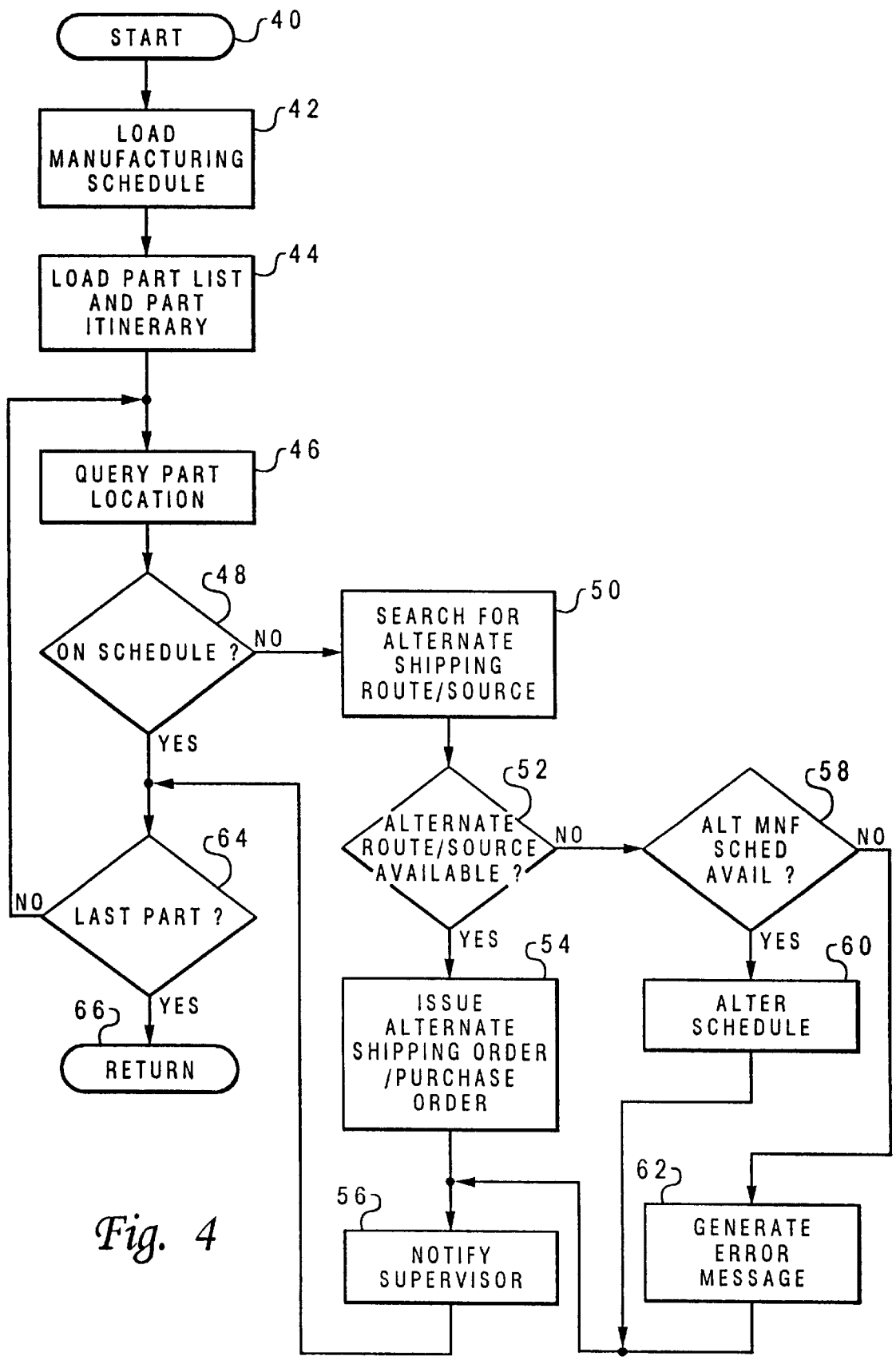
FIG. 4 is a high level logic flow chart illustrating the method of the present invention.

Finally, referring to FIG. 4, there is depicted a high level logic flow chart which illustrates the method of the present invention. As depicted, this process begins at block 40 and thereafter passes to block 42. Block 42 illustrates the loading of a manufacturing schedule into computer system 30 (see FIG. 3).

Next, as depicted at block 44, the part list and part itinerary for each shipment of parts or material is loaded into computer system 30. Thereafter, the process passes to block 46. Block 46 illustrates the querying of a part location by communication between computer system 30 and tracking module 20 to determine the actual location of shipping container 26.

That location is then utilized, as depicted within block 48, to determine whether or not a remotely originating material shipment is on schedule, as determined by comparing the actual location of shipping container 26 with the itinerary for that shipping container. If the shipment in question is on schedule, as indicated by no more than a minor variation between the actual location and the planned location, the process passes to block 64. Block 64 illustrates a determination of whether or not the part shipment recently queried is the last part shipment within the manufacturing schedule and if not, the process returns, in an iterative fashion, to block 46 to query the location of various other shipping containers 26 which form part of the manufacturing process. After the last shipping container containing material or parts for the manufacturing process has been queried, the process passes to block 66 and returns.

Referring again to block 48, in the event the current actual location of a particular shipment is not within a specified variation from the planned location, the process passes to block 50. Block 50 illustrates the searching within computer system 30 for an alternate shipping route or source. Those having skill in this art will appreciate that during shipment of material by various combinations of transport, such as ship and truck, points exist within the itinerary where alternate shipping routes may be selected. For example, overnight air delivery rather than truck delivery may be specified. Similarly, a nearer but higher priced source for a particular shipment of material may also be programmed within computer system 30 and available as a possible alternate source for material if the delay of the shipping container is determined to be sufficiently serious.

Next, the process passes to block 52. Block 52 illustrates a determination of whether or not an alternate route or source for the wayward shipment of material is available and if so, the process passes to block 54. Block 54 illustrates the issuance of alternate shipping orders or purchase orders in order to accommodate the scheduled manufacturing process. As described above, the alternate shipping orders or purchase orders may simply comprise the issuance of airfreight orders in place of truck shipping orders or the automatic placement of an order for material from a source which is closer to manufacturing facility 12.

Thereafter, after issuing alternate shipping orders or purchase orders, the process passes to block 56. Block 56 illustrates the notification of the manufacturing supervisor by means of an electronic message and the process then returns, in an iterative fashion, to block 64 to continue to check on the status of material necessary to accomplish the manufacturing schedule.

Referring again to block 52, in the event an alternate route or source of the delayed material is not available, the process passes to block 58. Block 58 illustrates a determination of whether or not it is possible to alter the manufacturing schedule. Again, those having skill in the art will appreciate that in a modern manufacturing process, the order in which various subprocesses within that process take place may possibly be altered, to accommodate the delayed arrival of particular parts or material. If an alternate manufacturing schedule is available, the process passes to block 60 which depicts the alteration of the manufacturing schedule automatically by computer system 30 and the process then passes to block 56, depicting the notification of the supervisor with respect to issued alteration of the manufacturing schedule.

Finally, referring again to block 58, in the event an alternate manufacturing schedule is not available, the process passes to block 62. Block 62 illustrates the generation of an error message by computer system 30, indicating that alternate sources of material, alternate shipping routes or alterations in the manufacturing schedule are not available and that human intervention will be necessary. Thereafter, the process passes to block 56, indicating a notification of the supervisor and thereafter passes, as described above, to block 64.

Upon reference to the foregoing, those skilled in the art will appreciate that by providing tracking module 20 which contains both wireless communication and position determination circuitry within each remotely originating shipment within a computer based manufacturing system, and by linking the tracking module to a computer system within the computer based manufacturing facility, the actual location of parts necessary to accomplish a manufacturing project may be accurately and efficiently determined in a manner which permits the manufacturing process to proceed in the most efficient manner possible.

While the invention has been particularly shown and described with reference to a preferred embodiment, it will be understood by those skilled in the art that various changes in form and detail may be made therein without departing from the spirit and scope of the invention.

I claim:

1. A method for optimizing material movement within a computer based manufacturing system comprising the steps of:

affixing a wireless communication device to each remotely originating material shipment;

coupling a position determination system to each wireless communication device;

loading a source of each remotely originating material shipment and an itinerary therefore into a computer;

loading a manufacturing schedule into said computer;

periodically querying each wireless communication device utilizing said computer;

determining a location of each remotely originating material shipment utilizing said position determination system and transmitting said location via said wireless communication device in response to each query;

periodically comparing an actual location of each remotely originating material shipment against a planned location determined in accordance with an itinerary for each remotely originating material shipment; and utilizing said computer to automatically alter said manufacturing schedule in response to a specified variation between said actual location and said planned location of a remotely originating material shipment.

2. The method according to claim 1 further including the step of automatically notifying a supervisor within said computer based manufacturing system in response to an alteration of said manufacturing schedule.

3. The method according to claim 1 wherein said step of utilizing said computer to automatically alter said manufacturing schedule in response to a specified variation between said actual location and said planned location of a remotely originating material shipment further comprises the step of altering an itinerary for a remotely originating material shipment in response to a specified variation between said actual location and said planned location of a remotely originating material shipment.

4. The method according to claim 1 wherein said step of utilizing said computer to automatically alter said manufacturing schedule in response to a specified variation between said actual location and said planned location of a remotely originating material shipment further comprises the step of altering a source for a remotely originating material shipment in response to a specified variation between said actual location and said planned location of a remotely originating material shipment.

5. A system for optimizing material movement within a computer based manufacturing system comprising:

a wireless communication device affixed to each remotely originating material shipment;

a position determination system coupled to each wireless communication device;

a computer control system having stored therein an indication of a source for each remotely originating material shipment and an itinerary therefore and a manufacturing schedule;

means for periodically querying each wireless communication device utilizing said computer system;

means for determining a position of each remotely originating material shipment utilizing said position determination system and transmitting said location via said wireless communication device in response to each query;

means for periodically comparing an actual location of each remotely originating material shipment against a plan location determined in accordance with an itinerary for each remotely originating material shipment; and means for utilizing said computer system to automatically alter said manufacturing schedule in response to a specified variation between said location and said plan location of a remotely originating material shipment.

6. The system according to claim 5 further including means for automatically notifying a supervisor within said computer based manufacturing system in response to an alteration of said manufacturing schedule.

7. The system according to claim 5 wherein said means for utilizing said computer system to automatically alter said manufacturing schedule in response to a specified variation between said actual location and said plan location of a remotely originating material shipment further comprises means for altering an itinerary for a remotely originating material shipment in response to a specified variation between said actual location and said plan location of a remotely originating material shipment.

8. The system according to claim 5 wherein said means for utilizing said computer system to automatically alter said manufacturing schedule in response to a specified variation between said actual location and said planned location of a remotely originating material shipment further comprises means for altering a source for a remotely originating material shipment in response to a specified variation between said actual location and said planned location of a remotely originating material shipment.

9. The system according to claim 5 wherein said wireless communication device comprises a cellular telephone communication device.

10. The system according to claim 5 wherein said position determination system further comprises a global positioning system receiver.

11. The system according to claim 5 wherein said means for periodically querying each wireless communication device utilizing said computer system comprises an automatic initiation of communication with said wireless communication device by said computer system via a telephone network.

* * * * *

UNITED STATES PATENT AND TRADEMARK OFFICE
CERTIFICATE OF CORRECTION

PATENT NO. : 5,835,377
DATED : November 10, 1998
INVENTOR(S) : Bush

It is certified that error appears in the above-identified patent and that said Letters Patent is hereby corrected as shown below:

Column 8, Line 22: Please add the word --actual-- before the word "location".

Signed and Sealed this

Twenty-second Day of June, 1999

Attest:

Q. TODD DICKINSON

*Attesting Officer*    Acting Commissioner of Patents and Trademarks